(12) United States Patent
Tian et al.

(10) Patent No.: US 9,706,497 B2
(45) Date of Patent: Jul. 11, 2017

(54) OPEN-LOOP FREQUENCY LOCK METHODS FOR FAST BOOT-UP TIME

(71) Applicant: Freescale Semiconductor, Inc., Austin, TX (US)

(72) Inventors: Yushi Tian, San Diego, CA (US); Wayne (Siwei) Tang, San Diego, CA (US); Handiono Santosa, San Diego, CA (US)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 14/853,167

(22) Filed: Sep. 14, 2015

(65) Prior Publication Data

US 2016/0007281 A1    Jan. 7, 2016

Related U.S. Application Data

(63) Continuation of application No. 13/461,117, filed on May 1, 2012, now Pat. No. 9,160,415.

(51) Int. Cl.
*H04B 5/00* (2006.01)
*H04W 52/02* (2009.01)
*H04B 1/40* (2015.01)

(52) U.S. Cl.
CPC ............ *H04W 52/029* (2013.01); *H04B 1/40* (2013.01); *H04B 5/00* (2013.01); *H04B 5/0025* (2013.01); *H04W 52/0274* (2013.01); *Y02B 60/50* (2013.01)

(58) Field of Classification Search
CPC ..... H04B 5/00; H04B 5/0056; H04B 52/0225
USPC ............................................... 455/41.1, 41.2
See application file for complete search history.

(56) References Cited

U.S. PATENT DOCUMENTS

| | | |
|---|---|---|
| 2002/0078391 A1 | 6/2002 | Yeh |
| 2006/0145767 A1* | 7/2006 | Vaananen ............... H03J 7/10 331/16 |
| 2007/0174649 A1 | 7/2007 | Kuo et al. |
| 2009/0109032 A1 | 4/2009 | Braun et al. |
| 2010/0084918 A1* | 4/2010 | Fells ...................... H02J 5/005 307/32 |
| 2010/0216523 A1 | 8/2010 | Sebastiano et al. |
| 2011/0239031 A1 | 9/2011 | Ware et al. |
| 2012/0077432 A1 | 3/2012 | Rose et al. |
| 2012/0083205 A1 | 4/2012 | Marcu et al. |
| 2012/0161835 A1* | 6/2012 | David .................... H03L 7/146 327/157 |

\* cited by examiner

*Primary Examiner* — Wesley Kim
*Assistant Examiner* — Raj Chakraborty

(57) ABSTRACT

A method for a near field communication circuit includes entering a low power mode and subsequently determining to exit the low power mode. The method further includes generating an open loop clock signal and providing the open loop clock signal to circuits of the near field communication circuit during a low power mode exit duration. Subsequently a reference clock signal is received from a host and used to clock the near field communication circuit.

16 Claims, 5 Drawing Sheets

OPEN-LOOP FREQUENCY LOCK METHODS FOR FAST BOOT-UP TIME

CROSS REFERENCE TO RELATED APPLICATIONS

This application is a continuation of U.S. application Ser. No. 13/461,117 filed May 1, 2012, pending, which is incorporated by reference in herein in its entirety.

TECHNICAL FIELD

The present invention relates generally to radio communication devices. More particularly, the present invention relates to open-loop frequency lock methods for fast boot-up time in a radio communication device.

BACKGROUND

In modern telecommunication devices, reducing power drain is of prime importance. This is especially true for portable devices powered by battery. Reducing power drain increases battery life. This increases user convenience and the usefulness of the telecommunication device.

Accordingly, a variety of techniques have been developed to reduce power drain in such telecommunication devices. One known technique is to enter a low power mode by powering down selected portions of the communication device. The selected portions can be powered up again periodically or when needed. When the selected portions become active, they can remain active and powered up while needed. When active communication begins, some or all of the device exits the low power mode.

A communication device needs to be ready to initiate communication when required, even when the communication is initiated remotely. However, to begin receiving transmissions, the communication device needs to power up or keep powered up certain components such as a receiver, demodulator, clock generator, etc. To get the lowest power drain, as much of this circuitry as possible should be powered down.

However, when powering up again, the powering up process must be done very quickly. This is necessary to ensure that no communications intended for the communication device are missed. In some cases, a system specification even determines the maximum time permitted to receive and respond to a received communication.

Further improvements to such systems and methods will continue to make them attractive options to businesses and consumers.

BRIEF DESCRIPTION OF THE DRAWINGS

The innovation may be better understood with reference to the following drawings and description. In the figures, like reference numerals designate corresponding parts throughout the different views.

DETAILED DESCRIPTION

The method and system disclosed herein find particular application in a near field communication (NFC) device. Near field communication is a very short-range (e.g., 20 cm), wireless point-to-point interconnection technology. NFC has evolved from earlier radio frequency identification (RFID), contactless identification and other interconnection standards. NFC enables users of portable electronic devices to communicate with a device such as an NFC reader. In this manner, the user can obtain content and services by bringing the portable device near to the NFC reader. The devices connect and communicate in response to their mutual detection. In some examples, the communication operates by inductively coupling the NFC device in the portable device with the NFC reader. Exemplary frequencies for communication include 13.56 MHz carrier frequency. Exemplary data rates include 106 kbps, 212 kbps and 424 kbps. The disclosed method and system may be readily extended to a wide variety of other applications and devices, however, and should not be limited to the particular exemplary details disclosed herein.

Figure 1:
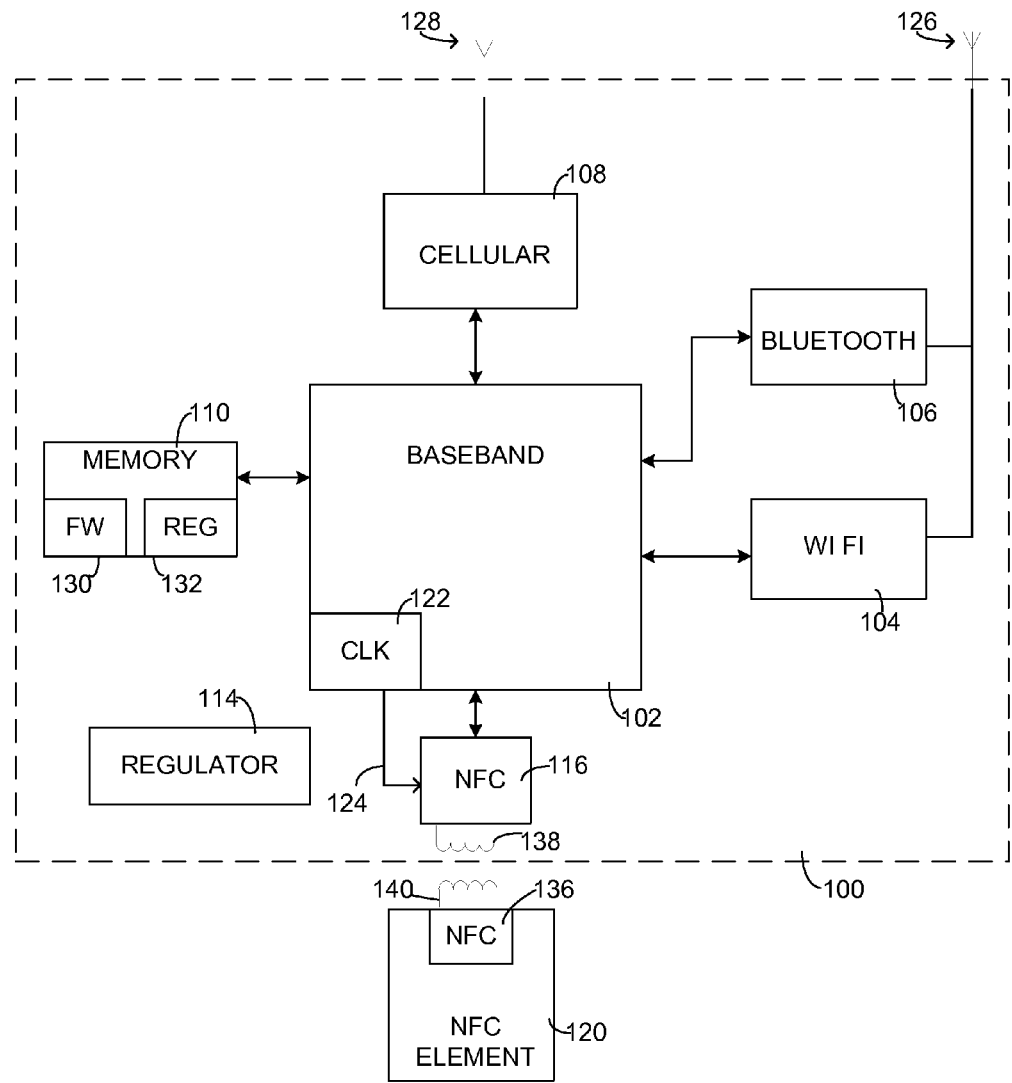
FIG. 1 is a block diagram of an example portable electronic device.

Referring now to FIG. 1, it shows a block diagram of a portable electronic device 100. The portable electronic device 100 includes a baseband circuit 102, a WiFi circuit 104, a Bluetooth circuit 106, a cellular circuit 108, memory 110, a voltage regulator 114, and a near field communication (NFC) device 116. The portable electronic device 100 is intended to be exemplary only and to show one embodiment of an operating environment in which the present method and system may be employed. In the illustrated embodiment, the portable electronic device 100 forms a portable communication device operable on a wide variety of communication networks. In other embodiments, the portable electronic device 100 may employ more or fewer elements depending on operational requirements. Not all components of the portable electronic device 100 are shown in the drawing so as to not unduly complicate the figure.

The baseband circuit 102 provides control of operation of the portable electronic device 100. This includes control of radio communication by the portable electronic device 100. The baseband circuit 102 may be implemented in any suitable manner, including as a general purpose data processor or as a dedicated processor. The baseband circuit 102 implements various functions and includes features such as a clock circuit 122. The clock circuit 122 generates one or more clock signals and provides clock signals to other portions of the baseband circuit 102 and other components of the portable electronic device 100. One such clock signal is a reference clock signal on clock line 124, provided to the NFC device 116.

The WiFi circuit 104 provides radio communication with remote devices. In exemplary embodiments, the WiFi circuit 104 communicates data over a wireless local area network (WLAN) using standards established by the Institute of Electrical and Electronics Engineers' (IEEE) such as IEEE standard 802.11 including variants such as 802.11a, 802.11b, 802.11g and 802.11n. Any suitable device or circuit may provide the required digital and analog operation to establish and maintain WiFi communication. Further, the WiFi device 104 may be replaced with or supplemented by any device capable of two-way radio communication with another device. The WiFi device 104 is coupled to an antenna 126 for effective radio communication.

The Bluetooth circuit 106 provides radio communication with remote devices as well, according to the Bluetooth standard. Bluetooth is a wireless technology standard for exchanging data over short distances, operating on a radio frequency band from 2400-2480 MHz, from fixed and mobile devices. The Bluetooth circuit 106 may be used to create one or more personal area networks (PANs). Any suitable device or circuit may provide the required digital and analog operation to establish and maintain Bluetooth communication. The Bluetooth circuit 106 may be replaced or supplemented with any other device or circuit capable of two-way radio communication with another device. The Bluetooth circuit 106 is also shown coupled to an antenna 126 for effective radio communication. In some embodiments, it may be preferable to use separate antennas for the WiFi circuit 104 and the Bluetooth circuit 106.

The cellular circuit 108 provides two-way broadband radio communication with remote devices in a cellular or other network. The cellular circuit may operate according to one or more broadband radio standards to provide mobile communication with a wide area broadband network including a plurality of base stations. The radio communication is mobile in that a radio communication link established by the portable electronic device 100 is readily handed off from one base station to another base station, without disruption. Any suitable device or circuit may form the cellular circuit 108, and, as noted, the cellular circuit 108 may communicate according to one or more cellular standards, including those now existing and proposed and any which may be developed in the future. The cellular circuit 108 is coupled to an antenna 128 for effective radio communication.

The memory 110 stores data and instructions for controlling operation of the other components of the portable electronic device 100. For example, the baseband circuit 102 may access the memory 110 to retrieve data or instructions or store data. In some embodiments, the memory 110 may be distributed throughout components of the portable electronic device 100. For example, the cellular circuit 108, the Bluetooth circuit 106 and the WiFi circuit 104 may each include memory for storing data and instructions. Portions of the distributed memory may be accessible to other portions of the portable electronic device 100 as well.

The memory 110 includes firmware 130 and a register stack 132. The firmware is a portion of memory which persistently stores data and instructions for use by the portable electronic device 100. The stored data and instructions may include commonly used routines such as boot up routines operable when power is first applied to the portable electronic device 100, power down routines operable when power is removed from the portable electronic device 100, and sleep mode routines operable when entering and exiting a low power sleep mode. The firmware 130 may be implemented as flash memory or other persistent memory which retains stored data when power is removed.

The register stack 132 includes a set of storage locations dedicated to storage of data for designated purposes. For example, variable data that is commonly used by one or more routines implemented by processors of the portable electronic device 100 may be stored at a register of the register stack. The address of the designated register is commonly known and used to retrieve the value stored there. The registers of the register stack need not be contiguously located or even located in a common physical memory device.

The voltage regulator 114 provides needed operating voltages to other components of the portable electronic device 100. For example, the cellular circuit 102, the Bluetooth circuit 106 and the WiFi device 104 as well as the NFC circuit 1116 may require a well-regulated DC voltage or other signal for proper operation. The voltage regulator 114 may generate the required signal. The generated voltage may be regulated against variations in temperature, supply voltage, manufacturing process and other factors.

The NFC device 116 is operable to perform near field communication with another device in accordance with a NFC standard or on another basis. In the exemplary embodiment, the NFC device 116 is positioned to communicate with NFC element 120. The NFC element 120 itself includes a NFC circuit 136. When the portable communication device 100 including the NFC device 116 is brought into sufficient proximity or in contact with the NFC circuit 136 of the NFC element 120, the NFC device 116 and the NFC circuit 136 communicate using radio frequency transmission. Each NFC apparatus has a respective antenna. The NFC device 116 has an inductive coil 138 and the NFC circuit 136 has an inductive coil 140. Radio communication may be, for example, on the ISM band of 13.46 MHz. Generally, the NFC device 116 and the NFC circuit 136 must be less than about 10 cm apart to exchange data.

The NFC element 120 may be an item containing data to be retrieved by the NFC device 116, in which case the NFC device 116 acts as an NFC reader. Alternatively, the NFC element 120 may be an NFC reader which retrieves data from the NFC circuit 116 of the portable communication device 100.

Any suitable NFC apparatus may be employed for either the NFC device 116 or the NFC circuit 136. In some embodiments, the NFC circuit 136 is implemented in accordance with the embodiment illustrated in FIG. 2. Similarly, in some embodiments, the NFC circuit 116 is implemented in accordance with the embodiment illustrated in FIG. 2

Figure 2:
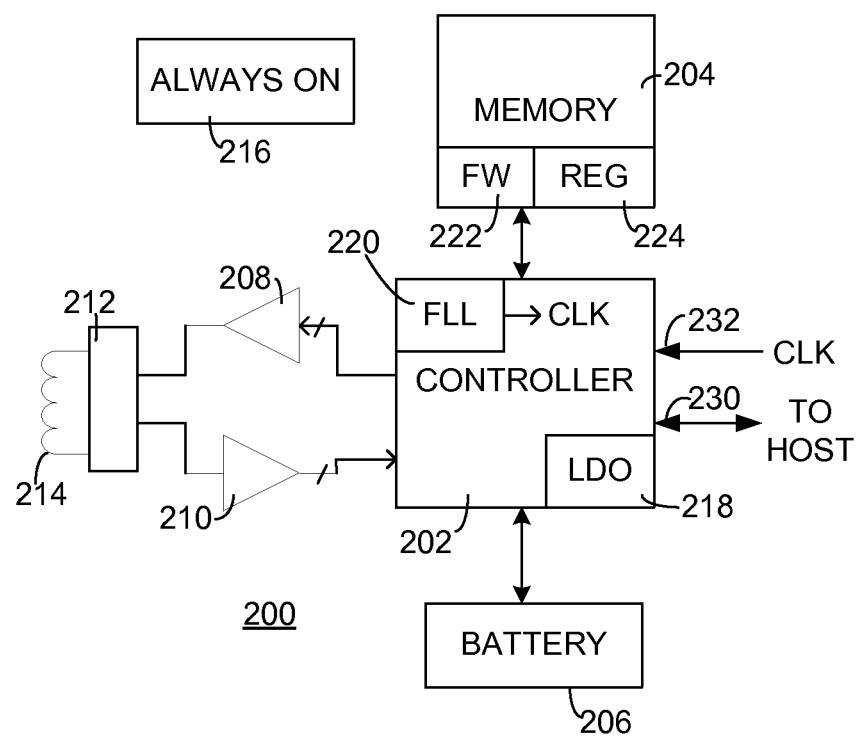
FIG. 2 is a block diagram of an example near field communication circuit.

FIG. 2 is a block diagram of a near field communication (NFC) circuit 200. The NFC circuit 200 includes a controller 202, a memory 204, a battery 206, a transmitter 208, a receiver 210, a matching network 212, an antenna 214 and an Always On circuit 216. The NFC circuit 200 may be embodied as a single integrated circuit if the battery 206 is omitted. Otherwise, the NFC circuit 200 may include the battery and possibly other components in modular form. The embodiment of FIG. 2 is intended to be exemplary only and other embodiments will include different structure or arrangements of components and will provide different functionality.

The controller 202 provides operational control of the NFC circuit 200. The controller 202 may be embodied as an integrated circuit, a logic circuit, or a hybrid element including both analog circuits and digital logic elements. The controller 202 includes a frequency locked loop (FLL) 220 and a low drop out regulator (LDO) 218. The FLL 220 operates to provide one or more clocking signals such as the internal clock signal CL to components of the NFC circuit 200. Preferably, the FLL 220 is an all-digital frequency locked loop (ADFLL) which produces output signals by operation of logic circuits using stored data values and without any analog components. Operation of the FLL will be described in greater detail below.

The LDO 218 operates as a power supply for the other components of the NFC circuit 200. The LDO may be selectively powered down by the controller upon entry into a low power mode or mode of operation.

The memory 204 stores data and instructions required by components of the NFC circuit 200. In the illustrated embodiment, the memory 204 includes firmware 222 and a register stack 224. The firmware 222 stores data and commands for operation of the controller 202. The stored commands and data may control the controller to implement operational routines such as entry into a low power sleep mode, exit from the low power mode, generation of data to be communicated from the NFC circuit, and other routines.

The register stack 224 includes a plurality of registers or data storage elements for storing data. The stored data may be values required for operation of components of the NFC circuit 200, or may be commands for controlling operation of the controller 202. The memory 204 may be distributed among other components or may be a device separate from the controller 202. Further, the memory 204 may include various types of memory such as random access or read-write memory, read-only memory including Flash and other electrically alterable storage.

The battery 206 provides operational power for the NFC circuit 200. In some embodiments, the battery 206 may be replaced by or supplemented with an energy harvesting circuit which responds to radio frequency energy impinging on the NFC circuit 200 and produces an operating voltage for the components of the NFC circuit 200.

The transmitter 208 provides conversion of digital data from the controller 202 to analog voltages necessary to drive the antenna 214. Similarly, the receiver 210 converts received signals due to excitation of the antenna to digital data for use by the controller 202. The matching circuit 212 buffers signals between the transmitter 208, the receiver 210 and the antenna 214. These circuits may be selectively powered down by the controller 202 upon entry into the sleep mode.

The Always On circuit 216 includes a portion of circuitry of the NFC circuit 200 which remains powered on when the NFC circuit 200 enters a low power or sleep mode of operation. The Always On circuit 216 may include any suitable components or logic necessary to return the NFC circuit 200 to full operation. These may include memory such as registers for storing data that will be required upon power-up, circuitry to detect presence of RF energy from a NFC reader, and a timer to time the duration of fixed-duration sleep mode periods. Other components of the NFC circuit 200 may have switchable power supplies under control of the controller 202. The switchable power supplies may be powered down upon entry into the sleep mode. The Always On circuit 216 however does not have switched power. The Always On circuit 216 is illustrated in FIG. 2 as a discrete element independent of other components. However, this is for illustration purposes only. The circuit elements that form the Always On circuit 216 may be located physically throughout the NFC circuit 200.

The controller 202 includes a port 230 for communicating data with a host device and a clock input 232 for receiving a clock signal from the host device. In the embodiment of FIG. 1, the baseband circuit 102 serves as the host device for the NFC circuit 116.

Upon entry into the low power mode, most of the circuitry of the NFC circuit 200 is powered down to reduce power drain on the battery 206 when the NFC circuit 200 is not operational. In the sleep mode, the controller 202 occasionally energizes necessary circuitry to determine if active operation is required. For example, if a signal is to be detected at the receiver 210, the receiver 210 and other components must be energized to detect the signal. The FLL 220 must be energized to provide a clock signal to respond to the received signal.

However, re-energizing the necessary circuits takes time. Necessary control functions must be implemented to activate the circuits, energy must be applied (and parasitic capacitances charged) and the circuits must stabilize before they can be reliably used. However, one system specification requires that the NFC circuit 200 respond to a challenge within 5 ms.

In the past, NFC circuits have relied on a phase-locked loop (PLL) to provide necessary clocking signals. The PLL would in turn be clocked by a reference clock supplied to the NFC circuit from the host device or a crystal. If provided by the host, the delay to receive the clock on power up could take up to 6 ms. This delay is too long to meet the specified 5 ms requirement.

One alternative is to use the internally generated clock from the PLL to provide the necessary clocking signals on power-up. The delay from entry into power up until clock availability would be sufficiently short. However, a PLL circuit takes time to stabilize to the desired frequency. On power-up, the PLL could come up in an unexpected frequency.

By using an ADFLL, the frequency of clock signals produced by the FLL 220 is tightly controlled. The frequency is based on a data value stored in a register such as in the register stack 224. The data value is processed to produce the output clock signal. The output clock signal is thus independent of supply voltage and manufacturing process and only dependent on operating temperature.

Figure 3:
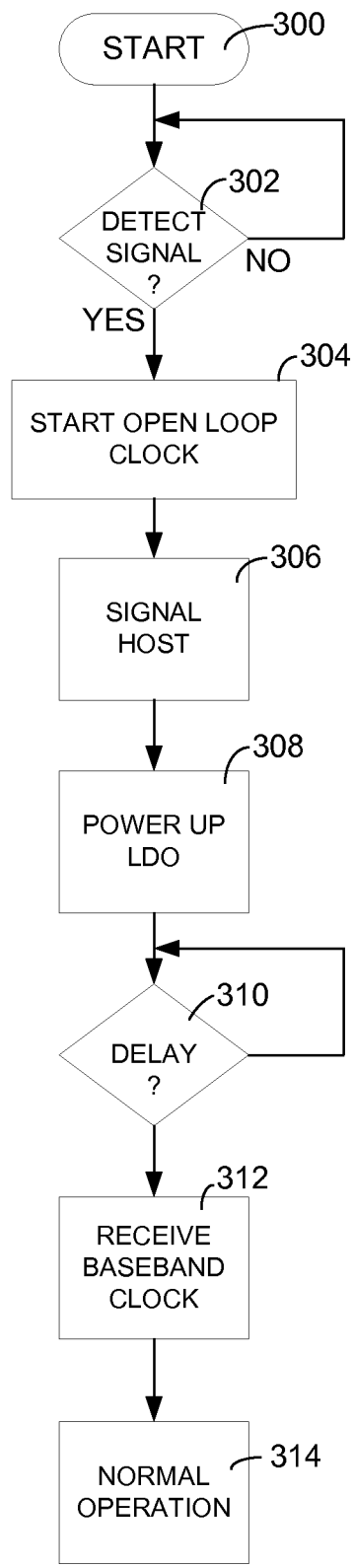
FIG. 3 is a flow diagram illustrating an exemplary power up operation to exit a low power sleep mode of the near field communication circuit of FIG. 2.

FIG. 3 is a flow diagram illustrating a power up operation to exit a low power sleep mode of the NFC circuit 200 of FIG. 2. The illustrated method may be implemented in hardware, firmware, software or any combination of these. The method begins at block 300.

At block 302, the method determines if the low power mode should be exited. As illustrated, in one embodiment, the presence of a signal is sensed. The signal is the presence of radio frequency energy from an NFC reader impinging on the NFC circuit 200. If such RF energy is present, the NFC circuit should wake up and begin responding to the signal. If no signal is present, control remains in a loop including block 302. A delay may be inserted before the sensing time. In another embodiment, in addition to or instead of detecting a signal, the method may include monitoring a timer or interrupt mechanism. In response to expiration of the timer or occurrence of an interrupt, the low power mode will be exited. The operations of block 302, along with related operations to monitor the low power mode, are performed for example by the Always On circuit of FIG. 2.

At block 304, the open loop clock signal CLK is started. The open loop clock signal CLK is generated, for example, by the frequency locked loop 220 of the NFC circuit 200 of FIG. 2. The open loop clock signal CLK is provided to all circuitry of the NFC circuit 200 which requires a clock signal during the exit from sleep mode. The open loop clock signal CLK has a substantially controlled frequency produced by the FLL 220. The frequency of the open loop clock signal CLK varies only with temperature. The calibration process disclosed herein ensures that the frequency of the open loop clock signal CLK is maintained within acceptable tolerance, such as 6% of its nominal value. Moreover, the use of the digitally generated open loop clock signal CLK ensures that the NFC circuit 200 is powered up and ready to process incoming RF data from the NFC reader within specified times, such as 5 ms.

At block 306, the method includes signaling the host to exit low power mode and become active. At block 308, the method includes powering up the low dropout regulator or other power source which provides local power to the circuits of the NFC circuit.

At block 310, the method includes waiting a delay period for the host to become active. The host responds to the signal provided to the host by the NFC circuit at block 306. Among other processes, the host will power up its clock source. A programmable time delay may be implemented to cause the NFC circuit to wait for the host to sufficiently exit the low power mode. For example, one aspect of the host powering up is energizing a phase locked loop or other clock circuit which generates the reference clock. To obtain frequency lock and stable performance may take a known amount of time. Therefore, the manufacturer of the host may specify an amount of time before which the reference clock becomes valid. This time may be, for example, 10 to 12 ms.

The host clock source may be well regulated so as to maintain high precision frequency control across variations in temperature and supply voltage. One example of a well regulated clock source is a phase locked loop. When the host clock source is stable, it begins providing a well-regulated baseband clock signal to the NFC circuit. The externally generated baseband clock signal, when available at the NFC circuit, can be used in place of the locally generated open loop clock signal CLK.

Thus, use of the open loop clock signal during power up operation upon exit from low power sleep mode provides unique benefits. Because the open loop clock signal is generated with an open loop circuit using a stored digital value, the open loop clock signal is immediately stable and with a sufficiently precise frequency value for use to clock the circuits of the NFC circuit during the power up operation. When the baseband clock signal becomes available, it can be substituted for the locally generated open loop clock signal.

At block 314, normal operation of the NFC circuit begins. The components of the NFC circuit that require a clock signal can be clocked by the externally generated clock signal received from the host.

Figure 4:
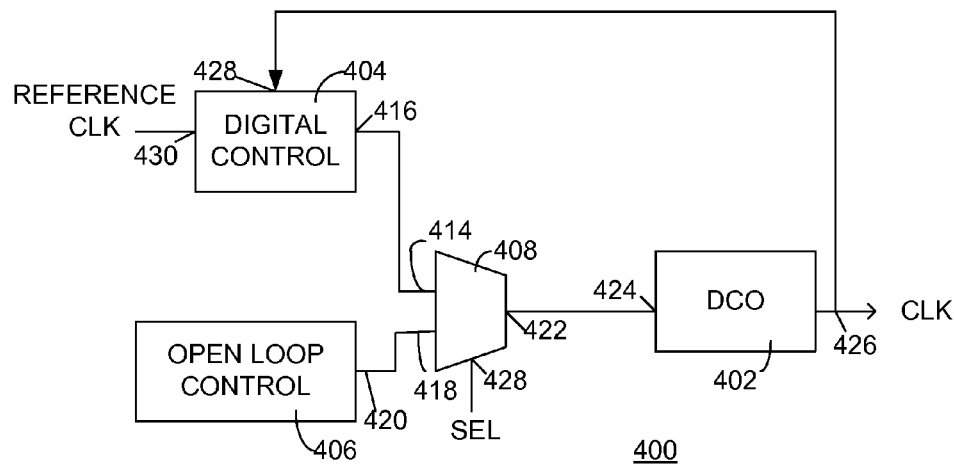
FIG. 4 is a block diagram of a first example clock calibration arrangement that may be implemented by the near field communication circuit of FIG. 2.

FIG. 4 is a block diagram of a clock calibration arrangement 400 that may be implemented by the NFC circuit 200 of FIG. 2. The clock calibration arrangement 400 may be used to calibrate the open loop clock signal generated by the frequency locked loop 220 of the NFC circuit 200.

The open loop clock calibration arrangement 400 includes a digital controlled oscillator (DCO) 402, a digital control circuit 404, an open loop control circuit 406 and a multiplexer 408. The multiplexer 408 has a first input 414 coupled to an output 416 of the digital control circuit 404 and a second input 418 coupled to the output 420 of the open loop control circuit 406. The output 422 of the multiplexer 408 is coupled to the input 424 of the DCO 402. The output 426 of the DCO 402 is coupled to a feedback input 426 of the digital control circuit 404. The multiplexer 408 has a select input 422 to select which of the inputs 414, 418 is coupled to the output 422. The digital control circuit 404 has an input 430 to receive a clock signal CLK.

The DCO 402 receives a multi-bit digital signal at the input 424 and produces a time varying output signal at the output 426. The output signal is the open loop clock signal CLK, or the signal CLK may be generated directly or indirectly from the output signal at the output 426. The frequency of the time varying output signal is proportional to the input value of the digital signal at the input 424. The frequency to control input relationship is approximately linear. However, the frequency of the output signal varies with temperature, producing a family of curves on a plot of output frequency vs. input value. Accordingly, there is a need to calibrate the frequency of the output signal at the output 426. Calibration is performed at a particular operating temperature and the arrangement is subsequently used with the assumption that operating temperature changes only slowly.

The open loop clock calibration arrangement 400 allows comparison of the open loop clock signal generated by the FLL 220 of the NFC circuit 200, or other circuit, with a precision clock signal such as the reference clock signal received from the host at the input 232 of the NFC circuit 200. The reference clock signal may be generated by the host using a crystal or phase locked loop or other precision source. Thus, the reference clock signal is well-controlled and its frequency value is compensated against variations in temperature, operating voltage and manufacturing process.

The reference clock signal is received at the input 430 of the digital control circuit 404. However, this signal is not always available. Specifically, during times when the host is in the low power mode, this signal is not generated and therefore not provided to the NFC circuit 200. However, during times when the reference clock signal is available, it may be used to calibrate the open loop clock signal.

Figure 5:
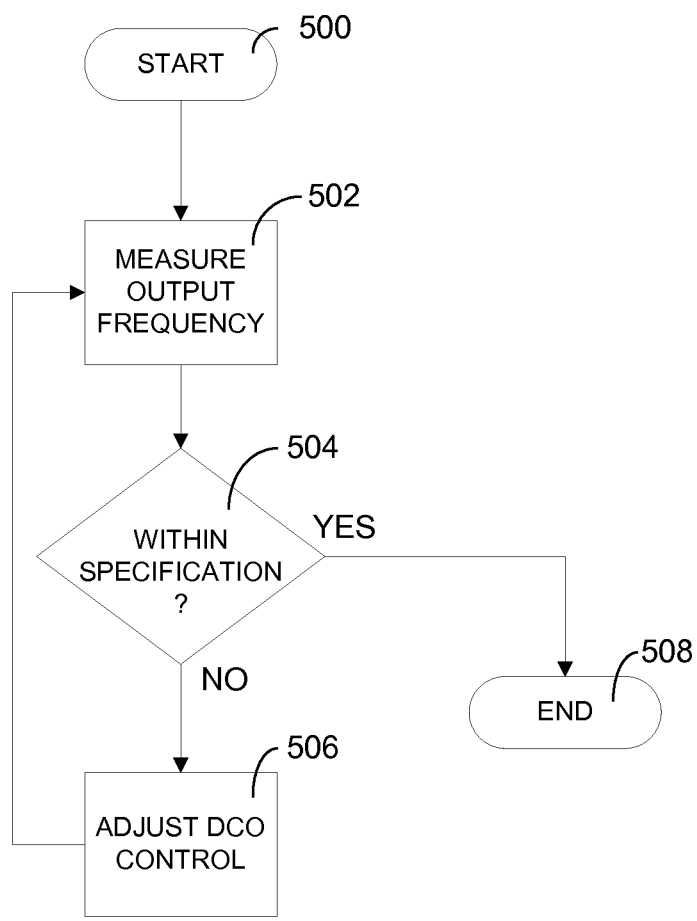
FIG. 5 is a flow diagram illustrating an example of calibration of the open loop clock signal in the near field communication circuit of FIG. 2.

Thus, the FLL which generates the open loop clock signal can be calibrated by selectively applying the reference clock signal and the open loop clock signal to the DCO 402. FIG. 5 is a flow diagram illustrating calibration of the open loop clock signal in the NFC circuit of FIG. 2. The method begins at block 500. At block 502, the output frequency is measured. The measured value may be the actual frequency value itself or data representative of the frequency or an approximation of the frequency. For example, a digital circuit may maintain count of the number of zero crossings or peak values of the open loop clock signal. The count forms data representative of the frequency. The count may be maintained in a register location.

At block 504, it is determined if the measured output frequency value from block 502 is within a specified tolerance. For example, the tolerance might be 6% of the nominal value. If the measured frequency is not within tolerance, control proceeds to block 506 to adjust the control signal provided to the input 424 of the DCO 402. This can be done, for example, by writing a new value to a register which stores the DCO input value. Control then returns to block 502 where the process is repeated. When the test of block 504 returns a positive result and the output frequency is at the specified value or within the specified range, the process ends at block 508.

The resulting calibration process is one of successive approximation. By adjusting the DCO control value produced by the open loop control circuit 406, the frequency of the clock signal at the output 426 of the DCO 402 may be adjusted until it approximates the frequency produced by the DCO in response to the digital control circuit 404. The multiplexer 408 receives a selection signal SEL at its input 428. This may be provided by the controller of the NFC circuit. In response to the selection signal SEL, the multiplexer 408 selects either data related to the reference clock signal from the digital control circuit 404 or data related the open loop signal from the open loop control circuit 406 as the input to the DCO 402. The multiplexer 408 provides the selected digital data word to the input 424 of the DCO 402. The DCO 402 produces at its output 426 a time varying signal having a frequency related to the digital data word at the input 424.

In this manner, the clock signal produced at the output 426 of the DCO 402 in response to signal from the open loop control circuit 406 may be compared to the signal produced at the output 426 of the DCO 402. The frequency values produced by the DCO 402 may be measured, for example, by counting pulses or zero crossings of the output signal. By comparing the measured output frequency or a representation of output frequency, the NFC circuit 200 can adjust the value used by the FLL to produce the output frequency for the open loop clock circuit.

The frequencies produced by the open loop control circuit of FLL will tend to vary with temperature. In contrast, the frequency of the reference clock signal is compensated against temperature variation. Thus, with temperature variation, there is a risk that the open loop clock signal will vary from the reference clock signal frequency.

This possibility is accounted for by periodically re-calibrating the FLL and the open loop clock circuit. For example, in one embodiment, the recalibration procedure is performed once per second. In most applications, operating temperature of the NFC changes relatively slowly so that a once per second recalibration is adequate to maintain the output frequency within a specified range.

The embodiment shown in FIG. 4 may be readily implemented using the controller 202 operating in conjunction with instructions and data stored in firmware 222. The open loop control circuit 406 operates to perform necessary calculations to measure the frequency of the output signals, to compare the measured frequencies, and to determine a correction necessary to adjust the DCO control signal. The calculations necessary to recalibrate the open loop control function of the FLL tend to increase power consumption by the NFC circuit 200.

A further improvement in reduction in power consumption by the NFC circuit 200 may be made by implementing the calibration function in hardware instead of in firmware. Hardware is implemented to compare the respective output frequencies due to the open loop circuit and the reference clock circuit. A digital value necessary to cause the FLL to produce the open loop clock signal at the frequency produced by the reference clock signal is determined by the hardware. This value is then stored in a register of the Always On circuit 216 so that it is immediately available when the NFC circuit 200 determines it must exit sleep mode. The stored value is then provided to the FLL which uses the stored value to rapidly begin generating the open loop clock signal. In this manner, the iterative algorithm to successively approximate the reference clock frequency is not needed. Power drain may be lowered even further.

Figure 6:
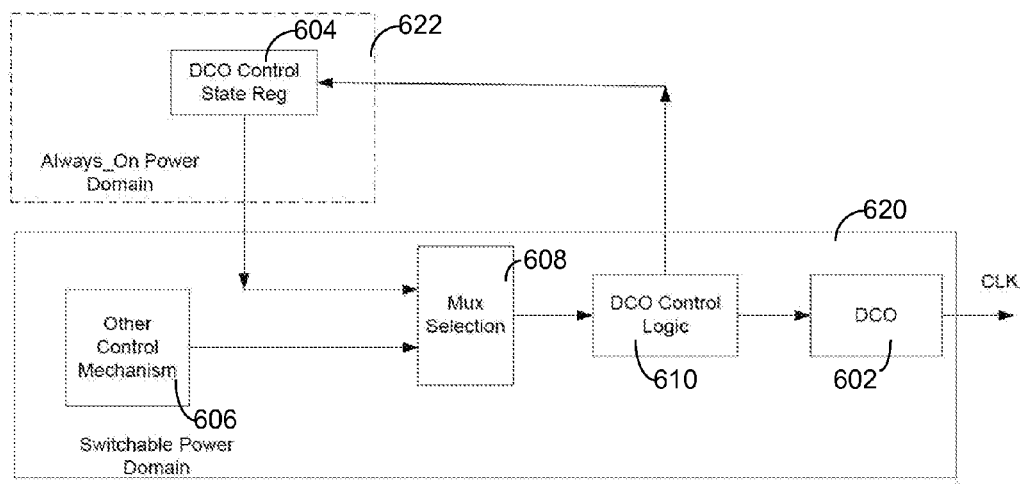
FIG. 6 is a block diagram of a second example clock calibration arrangement that may be implemented by the near field communication circuit of FIG. 2.

FIG. 6 is a block diagram of a hardware implementation of a calibration arrangement 600. The calibration arrangement 600 includes a digital controlled oscillator (DCO) 602, a DCO control state register 604, a control circuit 606, a multiplexer 608 and DCO control logic 610. The components illustrated in the exemplary embodiment of FIG. 6 are preferably classed in two groups. The DCO 602, the control circuit 606, the multiplexer 608 and the DCO control logic 610 are classed with the switchable power domain 622. The DCO control state register 604 is classed with the always on power domain 624. That is, to reduce power consumption by the NFC circuit incorporating the calibration arrangement 600, the components classed with the switchable power domain 620 are arranged with switchable power supply so that they can be turned to a low-power sleep state when their operation is not needed. Subsequently, these components of the switchable power domain 620 can be powered up to a normally powered state for conventional operation. In contrast, the components of the always on power domain are maintained with power on and are not switchable. Keeping the components of the always on power domain energized tends to increase power dissipation. However, keeping these components energized provides that benefit that they are in a ready, stable state when needed and data may be stored therein during the low power sleep mode. In particular, data may be reliably stored in the DCO control state register 604 when the rest of the calibration arrangement is placed in the low power mode.

The DCO 602 generally includes a ring oscillator to provide a time varying output signal, labeled CLK in FIG. 6. The DCO 602 provides the time varying output signal at a frequency related to the value of a digital word provided at a digital input to the DCO.

The DCO control logic 610 is a control circuit to provide a control word to the input of the DCO 602. In one embodiment, the control word is 10 bits in size. The DCO control logic 610 determines the appropriate control word value to provide to the DCO 602. The output frequency of the DCO generally varies only with temperature. DCO operation is generally compensated against variations in supply voltage and process parameters. Before power down or entry into the low power mode, the DCO control logic 610 stores the determined control word value in the DCO control state register 604 of the always on power domain 622. This ensures the control word value is immediately ready upon power up at exit from the low power mode. The necessary control word value does not have to be re-determined.

In the low power mode, the NFC components in the switchable power domain will periodically wake up and become active. This is done, for example, to determine if a communication is due or has been received at the NFC circuit. Under conventional operating conditions, the operating temperature of the NFC circuit including the DCO 602 will not vary significantly. Accordingly, the periodic powering up and storing a new control word in the DCO control state register 604 operates as a calibration of the open loop control circuit. The output frequency is periodically adjusted, along with temperature, if the temperature and frequency have varied. When the NFC circuit communicates with the host, the reference clock becomes available. The reference clock is compensated against temperature and voltage and other variations and is very reliable. So with every exit from the low power mode, the reference clock can be read and used to calibrate the DCO and then store the determined control word in the DCO control state register 604.

The control circuit 606 includes digital logic to implement the firmware method of calibrating the NFC open loop clock circuit, as described above in conjunction with FIG. 4. A successive approximation method may be used to vary the digital control word provided to the DCO 602. The multiplexer 608 is controlled by firmware of the NFC circuit to select whether the firmware calibration (control circuit 606) or the hardware calibration technique are used. Hardware calibration may be preferred as providing the lowest power operation by reducing power to the most circuitry. On the other hand, firmware calibration may be preferred as providing more flexibility and programmability, especially during initial testing.

From the foregoing, it can be seen that the presently disclosed method and system provide an improved frequency lock apparatus that both reduces both lock time and power dissipation of the circuit in which it is embodied. An all digital frequency locked loop provides an open loop clock signal. This signal can be produced rapidly and at accurate frequency upon exit from low power sleep mode. This signal can be used as the time base for a local circuit until a precision reference clock signal from a remote circuit becomes available. This allows substantial portions of the local circuit to be powered down. Further, this allows substantial portions of the remote circuit which generates the reference clock signal to be powered down as well. Further, the method and system provide an improved calibration technique. The frequency value of the open loop clock signal is periodically compared with the frequency value of the reference signal when the reference signal is available. The frequency of the open loop signal can be adjusted to match the frequency of the reference signal. By periodically updating the open loop frequency value, variation due to factors such as temperature can be approximately compensated. The described system and method find particular application in a near field communication circuit.

It is therefore intended that the foregoing detailed description be regarded as illustrative rather than limiting, and that it be understood that it is the following claims, including all equivalents, that are intended to define the spirit and scope of this invention.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A near field communication (NFC) circuit comprising:
   challenge detection circuitry responsive to a clock signal and operative to detect a challenge received from an NFC reader, the challenge requiring a response to be communicated by the NFC circuit for reception at the NFC reader within a standardized, predetermined response time;
   a frequency locked loop responsive to a digital word to generate an open loop clock signal as the clock signal at a frequency controlled by the digital word, the frequency locked loop selectively operable in a low power mode to reduce power consumption;
   a memory in data communication with the frequency locked loop and to be continuously powered when the frequency locked loop is operated in the low power mode, the memory configured to make the digital word immediately available to the frequency locked loop upon exit from the low power mode by the frequency locked loop so that the frequency locked loop may provide the open loop clock signal to the challenge detection circuitry to detect the challenge from the NFC reader for communication of the response to the challenge by the NFC circuit to the NFC reader within the standardized, predetermined response time; and
   calibration circuitry operative to adjust a frequency of the open loop clock signal to match frequency of a reference clock signal by:
      retrieving a data value from the memory;
      using the data value, generating the open loop clock signal;
      comparing a frequency of the open loop clock signal with a frequency of the reference clock signal;
      determining an adjusted frequency value suitable to reduce a difference between the frequency of the open loop clock signal and the frequency of the reference clock signal; and
      storing to a memory location in the memory a new data value corresponding to the adjusted frequency value.

2. The NFC circuit of claim 1 wherein the memory is configured to store instructions which are operative to cause the NFC circuit to signal a host device in data communication with the NFC circuit to exit the low power mode in response to the challenge from the NFC reader.

3. The NFC circuit of claim 2 further comprising:
   a reference clock input configured to receive a reference clock signal from the host device; and
   a controller in data communication with the reference clock input and the frequency locked loop, wherein the controller is responsive to the reference clock signal to control operation of the NFC circuit when the reference clock signal is available from the host device, and wherein the controller is responsive to the open loop clock signal from the frequency locked loop during a time duration when the host device is exiting the low power mode before the reference clock signal is reliably available from the host device.

4. The NFC circuit of claim 3 further comprising calibration circuitry operative to adjust frequency of the open loop clock signal to match a frequency of the reference clock signal by:
   generating the open loop clock signal using a current digital word;

determining an adjusted frequency of the open loop clock signal which reduces a difference between the frequency of the open loop clock signal and a frequency of the reference clock signal; and storing to a memory location in the memory a new digital word corresponding to the adjusted frequency.

5. The NFC circuit of claim 3 wherein the controller comprises a port for data communication with the host device and wherein the controller is responsive to the open loop clock signal from the frequency locked loop to signal the host device to exit the low power mode.

6. The NFC circuit of claim 5 wherein the controller comprises a timing circuit to implement a time delay to time a duration for the host device to exit the low power mode and upon end of the duration, to begin receiving the reference clock signal form the host device to control the operation of the NFC circuit in place of the open loop clock signal.

7. The NFC circuit of claim 1 wherein the frequency locked loop generates the open loop clock signal as the clock signal at a frequency which is sufficiently precise to clock circuits of the NFC circuit, the frequency locked loop generating the open loop clock signal that is stable in frequency within a time duration short enough for the NFC circuit to detect the challenge from the NFC reader for response to the challenge by the NFC circuit within the standardized, predetermined response time.

8. The NFC circuit of claim 1 wherein the calibration circuitry is further operative to iterate the frequency of the open loop clock signal to successively approximate the frequency of the reference clock signal until the frequencies match within a specified tolerance.

9. A portable communication device comprising the NFC circuit of claim 8.

10. A near field communication (NFC) circuit comprising:
a controller responsive to a clock signal to control operation of the NFC circuit, including operation in a normal mode and operation in a low power mode and during transition between the normal mode and the low power mode;
an always on circuit coupled with the controller and configured to detect radio frequency (RF) energy directed to the NFC circuit by a nearby NFC reader to initiate exit from the low power mode;
a frequency locked loop responsive to initiation of an exit from the low power mode to generate an open loop clock signal upon the exit from the low power mode, the frequency locked loop generating the open loop clock signal at a frequency pre-selected to time operation of circuits of the controller during the exit from the low power mode, the frequency locked loop being coupled with the controller to provide the open loop clock signal to the controller to control operation of the NFC circuit during the exit from the low power mode until a more precise clock signal becomes available to the controller to control operation of the NFC circuit following the exit from the low power mode, the open loop clock signal being provided to the controller during the exit from the low power mode so that the NFC circuit can reliably communicate a response to the nearby NFC reader, within a standardized predetermined response time required by the nearby NFC reader, to a challenge received by the NFC circuit during the low power mode; and
a calibration circuit configured to adjust a frequency of the open loop clock signal to match a frequency of a reference clock signal, the reference clock signal received by the controller from a host device, the controller responsive to the reference clock signal to control operation of the NFC circuit following the exit from the low power mode, wherein the calibration circuit is configured to:
retrieve a data value from a memory;
using the data value, generate the open loop clock signal;
compare a frequency of the open loop clock signal with a frequency of the reference clock signal;
determine an adjustment suitable to reduce a difference between the frequency of the open loop clock signal and the frequency of the reference clock signal; and
store to the memory a new data value corresponding to the adjustment.

11. The NFC circuit of claim 10 further comprising:
memory coupled with the controller and configured to store data and instructions to control operation of the NFC circuit; and
a digital controlled oscillator responsive to a control word stored in the memory to generate the open loop clock signal.

12. The NFC circuit of claim 10 wherein the calibration circuit is configured to iterate the frequency of the open loop clock signal to successively approximate the frequency of the reference clock signal.

13. A near field communication (NFC) circuit comprising:
a controller responsive to a clock signal to control operation of the NFC circuit, including operation in a normal mode and operation in a low power mode and during transition between the normal mode and the low power mode;
an always on circuit coupled with the controller and configured to detect radio frequency (RF) energy directed to the NFC circuit by a nearby NFC reader to initiate exit from a low power mode;
a frequency locked loop responsive to initiation of an exit from the low power mode to generate an open loop clock signal upon the exit from the low power mode to time operation of circuits of the controller during the exit from the low power mode until a reference clock signal becomes available to the controller to control operation of the NFC circuit following the exit from the low power mode; and
a calibration circuit operative to calibrate the open loop clock signal, the calibration circuit comprising:
a digital control circuit having an input to receive the reference clock signal, when available, and an output;
an open loop control circuit having an output;
a digital controlled oscillator having an input configured to receive a digital word and an output to provide the open loop clock signal; and
a switch to selectively apply one of the output of the digital control circuit and the output of the open loop control circuit to the input of the digital controlled oscillator.

14. The NFC circuit of claim 13 wherein the controller is operative to control the switch to selectively apply one of the output of the digital control circuit and the output of the open loop control circuit to the input of the digital controlled oscillator to calibrate a frequency of a signal at the output of the digital controlled oscillator to a frequency of a signal at the output of the digital control circuit which is based on the reference clock signal.

15. The NFC circuit of claim 14 wherein the controller is operative to calibrate frequency of the signal at the output of the digital controlled oscillator by iteratively adjusting a digital control value supplied by the open loop control circuit to successively approximate the frequency of the reference clock signal with the frequency of the signal at the output of the open loop control circuit.

16. The NFC circuit of claim 14 wherein, after calibrating the frequency, the controller is operative to store a calibrated digital control value in memory for subsequent access by the frequency locked loop to generate the open loop clock signal responsive to initiation of an exit from the low power mode.

* * * * *